United States Patent [19]

Quenot

[11] 4,186,490
[45] Feb. 5, 1980

[54] TAPE-TYPE LINEAR MEASURING INSTRUMENT

[75] Inventor: Michel C. A. Quenot, Ornans, France

[73] Assignee: Stanley-Mabo, France

[21] Appl. No.: 915,218

[22] Filed: Jun. 13, 1978

[30] Foreign Application Priority Data

Jun. 16, 1977 [FR] France ............................... 77 19054
Jun. 16, 1977 [FR] France ............................... 77 19055

[51] Int. Cl.² ........................... G01B 3/12; G01B 5/02
[52] U.S. Cl. .................................................... 33/139
[58] Field of Search ........................ 33/138, 139, 141;
235/92 DN, 92 EV; 364/561, 562; 250/215,
560, 570, 233

[56] References Cited

U.S. PATENT DOCUMENTS

| | | | |
|---|---|---|---|
| 1,237,808 | 8/1917 | Ottinger | 33/139 X |
| 2,014,375 | 9/1935 | Carlson | 33/138 |
| 2,484,817 | 10/1949 | Armond | 33/139 |
| 3,216,515 | 11/1965 | Roberts | 364/562 X |
| 3,364,580 | 1/1968 | Lucia | 33/138 X |
| 3,473,751 | 10/1969 | Quenot | 242/84.8 X |
| 3,780,440 | 12/1973 | Taylor | 33/139 |
| 4,031,360 | 6/1977 | Soule | 33/139 X |

Primary Examiner—Harry N. Haroian
Attorney, Agent, or Firm—Robert E. Burns; Emmanuel J. Lobato; Bruce L. Adams

[57] ABSTRACT

This tape-type linear measuring instrument comprises a perforated tape adapted to be unwound from or wound on a drum enclosed in a case containing a tape-engaging toothed wheel possibly driven from a motor with the interposition of a speed reducer. Pick-up means responsive to reference marks carried by the wheel or by a member rigid therewith control the operation of an electronic up-and-down counter associated with means for the digital display of the measured length. A shifting pinion may be interposed between the winding drum and the tape-driving toothed wheel to enable the motor to drive the tape both ways. The perforations may be replaced by spaced notches, and a support wheel may be disposed under the tape in co-planar relationship with the driving wheel.

29 Claims, 10 Drawing Figures

TAPE-TYPE LINEAR MEASURING INSTRUMENT

FIELD OF THE INVENTION

This invention relates to tape-type linear measuring instruments and has particular reference to a tape linear measuring instrument comprising means for causing the tape to be wound on, or unwound from, a winding drum.

DESCRIPTION OF THE INVENTION

This invention is directed to make the reading of the measurement easier and more convenient, while eliminating faulty readings. It is another object of the invention to provide an instrument of the type set forth hereinabove which is provided with a particularly simple and sturdy digital display device of which the essential component elements are safely protected during actual service and handling from dust, humidity, etc. which might interfere with the proper operation of the instrument.

To this end, the linear tape measuring instrument according to this invention is characterized by the fact that the means for digitally displaying the measurement in progress comprise a wheel constantly engaging the tape so as to rotate in synchronism with the tape movement, an electronic pick-up of which the movable member is driven by said wheel and provided with reference marks disposed at spaced intervals, and an electronic counter responsive to said pick-up and associated with optical display means.

Thus, an indirect digital reading is obtained, whereby only the wheel coacting with the tape is exposed externally while the other component elements of the display device can safely be enclosed in a protection case.

With this construction, the instrument can operate even if the tape is soiled by impurities or moistened, etc. On the other hand, a permanent positive engagement is provided between the wheel and the tape, this engagement advantageously consisting of teeth formed in the outer periphery of the wheel and meshing with perforations formed in said tape.

Moreover, in order to make the reading more accurate, and according to a preferred form of embodiment of the invention a reducer of which the geared-down output shaft is coupled to the tape-engaging wheel is provided, the high-speed input shaft of this reducer having mounted thereon a movable member constituting said movable element of the electronic pick-up controlling said electronic counter provided in turn with optical display means.

If a reducer is contemplated, the wheel may be caused to rotate as a consequence of the movement of translation of the tape proper, provided that the reducer is of the reversible type, i.e. the gear ratio is not too high, but in principle, if a reducer is provided, electric means must preferably be incorporated for driving the high-speed reducer shaft, and in this case the tape-engaging wheel is the tape-driving wheel.

Therefore, according to another feature characterizing this invention, when the means contemplated for winding and unwinding the tape in relation to the winding drum consist of an electric motor, at least one driving wheel is provided and this driving wheel is driven in turn by the electric motor via a reducer and meshes directly with the tape, this driving wheel being adapted to be driven at least in the tape unwinding direction.

Under these conditions it is clear that when required, the tape can advantageously be unwound, a feature particularly useful when a relatively long tape is used, for example a tape of the order of ten meters, especially in the case of a transversely curved and therefore relatively rigid metal tape; when a reducer is provided extremely simple and therefore economical micromotors can be used which are readily available commercially, such motors revolving at very high speeds of the order of 3.000 to 10.000 r.p.m.

To wind the tape and according to another feature characterizing this invention, a shifting pinion driven from the electric motor via the reducer is provided, this shifting pinion being adapted to be shifted between two positions, i.e. one position in which it meshes with the tape-engaging wheel and another position in which it meshes with the tape-winding drum for winding the tape.

According to another feature characterizing this invention, the tape is a metal tape and responsive to the force of a conventional return spring, the driving wheel being adapted to rotate in either direction for winding or unwinding the tape.

In order to afford a clearer understanding of this invention, various forms of embodiment thereof will now be described by way of example with reference to the accompanying drawings.

DESCRIPTION OF THE PREFERRED EMBODIMENTS

Figure 1:
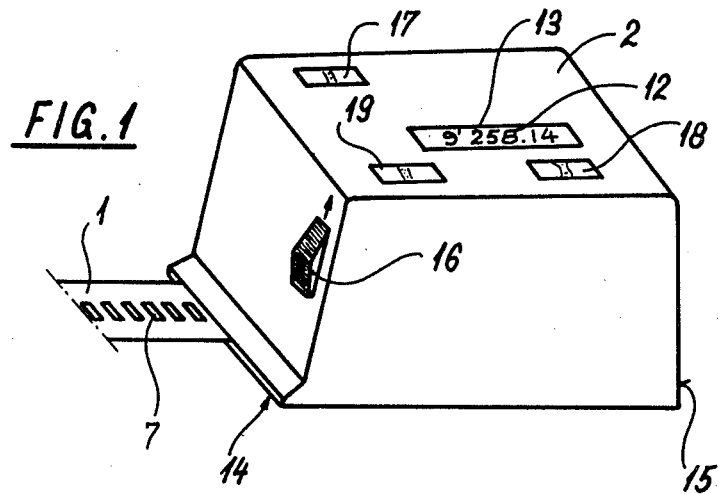
FIG. 1 is a diagrammatic perspective view of the measuring instrument according to the invention, incorporating a reducer and an electric drive.
Figure 2:
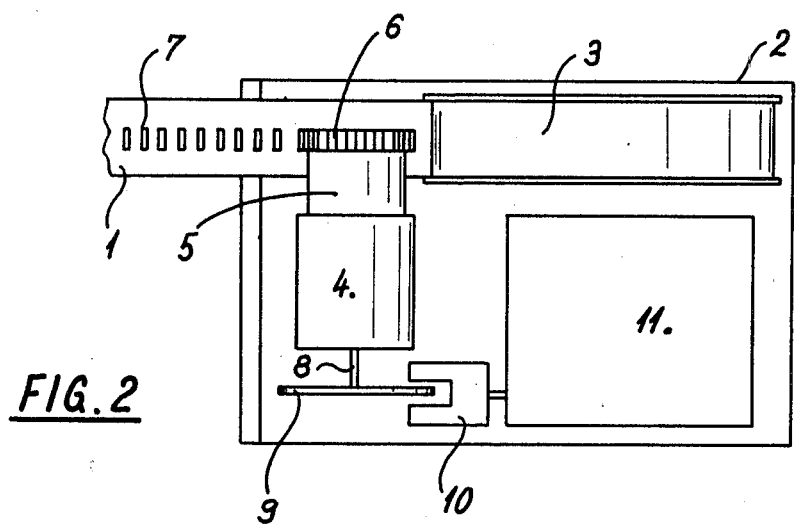
FIG. 2 is a diagrammatic plan view from above of the same instrument, the top wall of the case being removed to show the arrangement of the various component elements therein.
Figure 3:
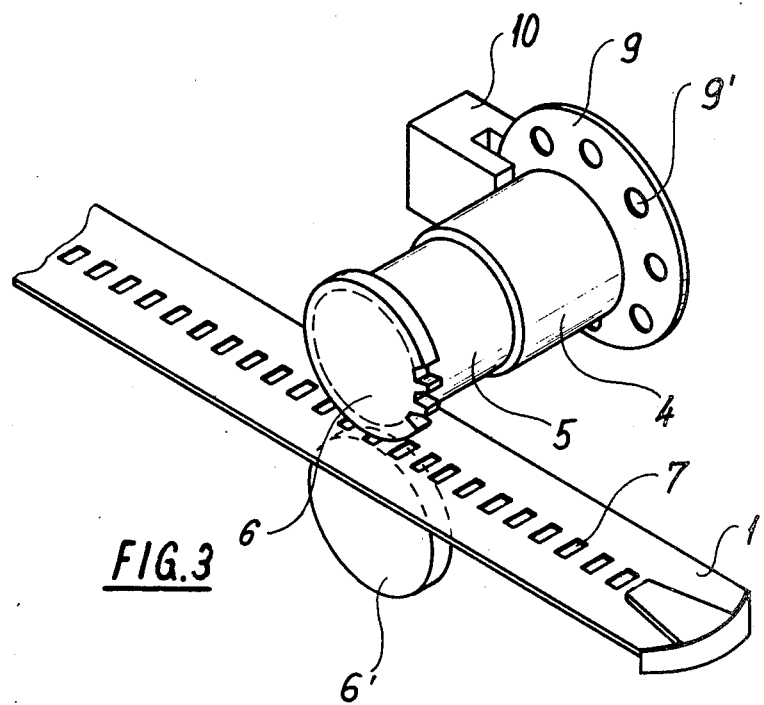
FIG. 3 is a fragmentary diagrammatic perspective view showing the pick-up means of the instrument.

Referring first to FIGS. 1 to 3 of the drawings, there is shown a linear measuring tape 1 normally wound on a drum enclosed in a case 2, the latter having for example a parallelepiped shape. The outward or inward movements of the tape in relation to the case are controlled by an electric motor 4 mounted in the case 2 and energized for instance from a battery (not shown). This motor 4, of the micromotor type readily available in the trade, may have for example a rated speed of 9.000 r.p.m. and is coupled to a reducer 5 for example of the epicyclic type having its low-speed shaft provided with a toothed wheel 6. This toothed wheel 6 is so arranged that its teeth engage matching perforations 7 formed through the tape along the median or center line thereof, the axis of rotation of the wheel being perpendicular to the direction of travel of the tape. Thus, when the toothed wheel 6 is caused to rotate in one or the other direction, the tape is moved in the corresponding direction somewhat in the fashion of a rack, each motor revolution corresponding to a relatively moderate movement of the tape. A counter wheel or support wheel 6' is disposed under the tape 1 in co-planar relationship to the toothed wheel 6.

The perforations 7 of tape 1 are formed at spaced intervals on the tape and correspond to a conventional graduation scale, for example with a 5-millimeter pitch; therefore, the toothed wheel 6 has the dual function of driving the tape 1 and detecting the number of perforations or reference marks 7 moving past the wheel axis. For this purpose, the output shaft 8 of motor 4, which corresponds to the high-speed or input shaft of the reducer, is provided with a disk 9 carrying appropriate marks or apertures 9' disposed at the proper pitch along its outer periphery, these marks moving past a pick-up 10 controlling in turn an electronic counter 11. This counter 11 is provided with digital display means 12 visible through a window 13 of the case; if desired, this digital display means may be of the electroluminescent or liquid crystal type.

The pick-up 10 may consist of example of a photoelectric cell responsive to the number of revolutions of the disk 9, or of holes 9' formed therethrough, this cell delivering control pulses to the electronic counter 11. Alternatively, this pick-up may be of the electromagnetic type capable of reading magentic reference marks carried by the disk 9.

In a modified embodiment of the invention, the outward and inward movements of translation of the tape with respect to the case 1 may be controlled through a friction wheel, or, in lieu of the above-mentioned perforations, the tape could have equally spaced notches formed along one edge and adapted to be engaged by matching teeth of the wheel 6. Besides, still in the case of an electric system for driving the tape, the reducer may be of a type other than the above-mentioned epicyclic type, for example of the worm and wheel type.

If, for instance, the gear ratio between the disk 9 and the toothed wheel 6 is 1:10, the circumference of the tooth wheel 6 being 100 mm and the disk 9 carries 100 reference marks 9', one revolution of this disk 9 will correspond to a 10-mm translation of the tape 1, and the distance between two adjacent marks will correspond to a 0.1-mm linear movement of the tape. If the velocity of the motor 4 and therefore of the disk 9 is 9.000 r.p.m., the pick-up will be capable of detecting 900.000 marks per minute. Thus, an extremely accurate measurement is made since a very small movement of the tape will correspond to a relatively wide angular movement of the disk.

According to a preferred form of embodiment of the invention, an up-and-down counter with separate display means is provided for displaying the measurement made in the tape winding and unwinding directions.

According to another modified embodiment of the invention, the electronic counter 11 may comprise a memory-type mini-computer for memorizing the measurements made with the instrument and performing arithmetical operations, such as addition, substraction, multiplication.

On the other hand, the electronic counter 11 may also be provided with means for adjusting the display by a preselected constant value, to permit notably the inner measurements, the measure origin corresponding at that time not to the slot 14 through which the tape is caused to come out from the case but to the end face 15 of case 2. This is useful notably for measuring the inner dimensions of a room, a piece of furniture, and the like. If desired, the possibility of resetting the counter when the tape has been pulled out to a predetermined extent from the case, so that the measurement display begins only at that distance, may be contemplated.

A clutch system, notably of the friction type, may also be contemplated at the output end of the motor for avoiding any damage to the instrument in case the tape were caught or jammed during the winding or unwinding thereof.

Moreover, a limit switch may be provided for deenergizing the motor when the tape has been wound home within the case, or unwound completely therefrom.

Of course, push-buttons are mounted on the case 2 for controlling the instrument. Thus, for example, one push-button 16 may control the electric motor from a zero position, so that when this button is pushed in one direction it controls the unwinding of the measuring tape and when it is pushed in the opposite direction the tape is wound in. A switch 17 may be provided for energizing the counter's circuits; a preselection button 18 enables the operator of selecting the type of measurements to be made, either external and direct or internal with the display of a predetermined constant value. A preselection button 19 may also be provided for selecting which length unit shall be used for the display, this button being connected to a conversion system incorporated in the case for converting the measurement made in the metric system directly into units pertaining to another system.

According to a preferred form of embodiment of this invention, the metric tape 1 is a relatively wide and transversely curved metal tape, its width ranging for example from 25 to 50 mm. Thus a relatively great length of this tape may be extracted or pulled out from the case before the tape bends or yields by gravity, so that the operator may make several measurements from a fixed location.

In order to insure a proper winding of the tape on its drum, a conventional return spring is incorporated in this drum.

Besides, the tape may also be provided with conventional graduations consisting of black or colored lines.

Means other than an electric motor may be provided for unwinding and rewinding the tape. Thus, mechanical means such as a crank may be contemplated for this purpose.

Figure 5:
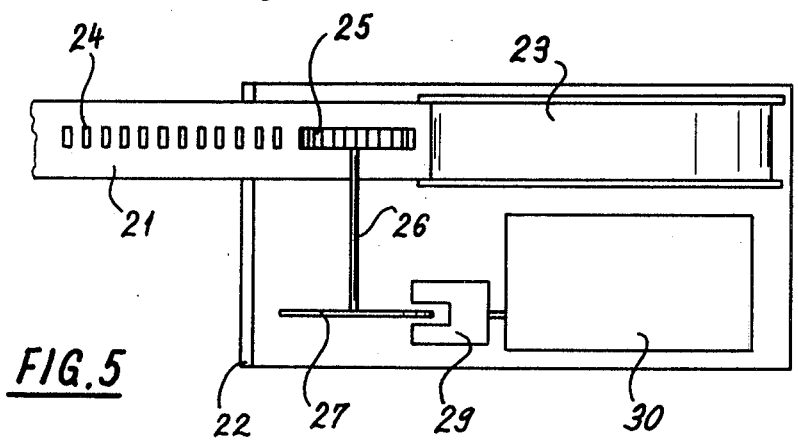
FIG. 5 is a diagrammatic top view of the form of embodiment of FIG. 4.
Figure 4:
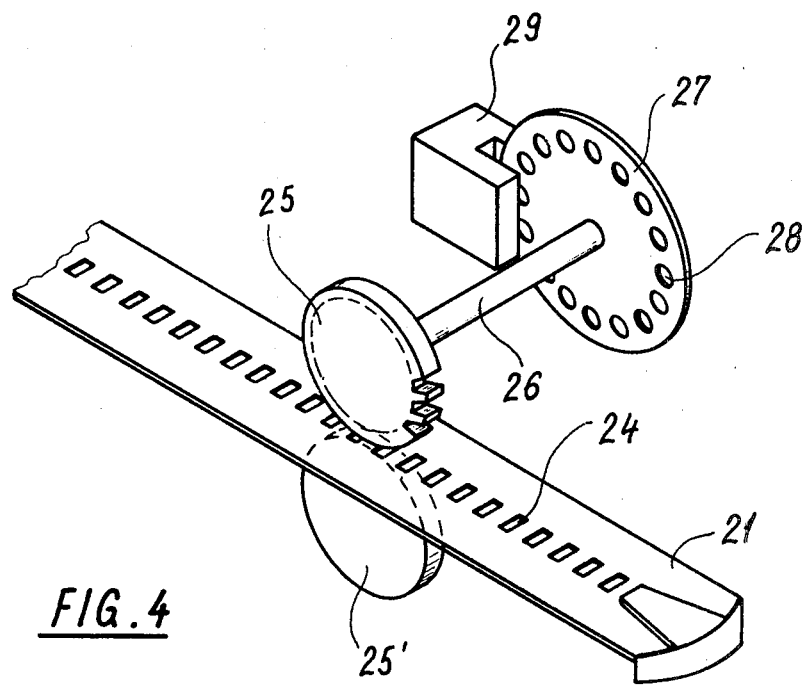
FIG. 4 is a view similar to FIG. 3 showing the pick-up means according to a modified embodiment of the instrument, without speed reducer.

Referring now to FIGS. 4 and 5 of the drawings, a modified form of embodiments of the length measuring instrument is illustrated therein. As in the preceding form of embodiment, the tape 21 is wound on a drum 23 mounted in a case 22 and responsive in the usual way to the force of a return spring. In this embodiment, the tape is not driven electrically since it can be pulled out manually from the case, and the automatic rewinding thereof, due to the force of the return spring, may be obtained by means of a push-button controlling the actuation of a brake. The tape 21 is provided with spaced perforations 24 having a pitch consistent with a conventional graduation scale, for example 5 millimeters. A toothed wheel 25 is mounted in the case 22 above the tape 21 in a plane perpendicular to the plane of the tape, so that the teeth of said wheel engage the perforations 24 and the unwinding of said tape is attended by the rotation of said wheel 25. A support wheel 25' is provided under the tape in co-planar relationship to the toothed wheel 25. The shaft 26 of this toothed wheel 25 is rigid with a disk 27 provided with regularly spaced reference marks or apertures 28. An electronic pick-up 29 is adapted to detect the reference marks 28 moving past as the tape is unwound, for controlling a battery-operated electronic counter 30. The battery (not shown) may be of the rechargeable or disposable type. This counter 30 comprises digital display means visible through a window formed in the case 22, this digital display being of the electroluminescent diode type or of the liquid crystal type.

As in the preceding form of embodiment, the operator can easily read through the window the distance through which the tape 21 has been pulled out from the case 22.

Of course, the tape 21 may also be provided with the conventional graduations.

The reference marks 28 carried by or formed on the disk 27 may be equal in number, if desired, to the number of teeth of the wheel 25, but this number of reference marks 28 may also be a multiple of the number of teeth of the wheel 25, in order to obtain a more accurate measurement.

The reference marks 28 carried by the disk 27 may be of optical type, for example in the form of holes, and the pick-up 29 is a photo-electric cell.

As an alternative, the reference marks 28 may be of magnetic type, and in this case an electromagnetic pick-up is used.

The other features and modifications described with reference to the first form of embodiment are also applicable to this second form of embodiment.

Other forms of embodiment may also be contemplated. Thus, for example, the toothed wheel co-operating with the measuring tape may be designed with a view to constitute directly the movable element of the pick-up. In this case, suitable reference marks may be provided on this wheel, or these reference marks may consist of the teeth proper.

Another possibility consists in utilizing a magnetic tape cassette coupled with the measuring tape proper, the magnetic signs carried by the magnetic tape being read by a magnetic detector or pick-up.

Besides, to prevent the perforations formed on the tape from being too close to each other, any pair of adjacent perforations may be shifted laterally away from each other, and in this case the toothed wheel comprises of course two rows of teeth having the same relative off-set.

Though the present invention is described and illustrated herein as concerning a measuring instrument comprising a case, it is clear that the same principles may be used in a frame-type measuring tape, and in this case the digital display is incorporated in the frame proper.

Figure 6:
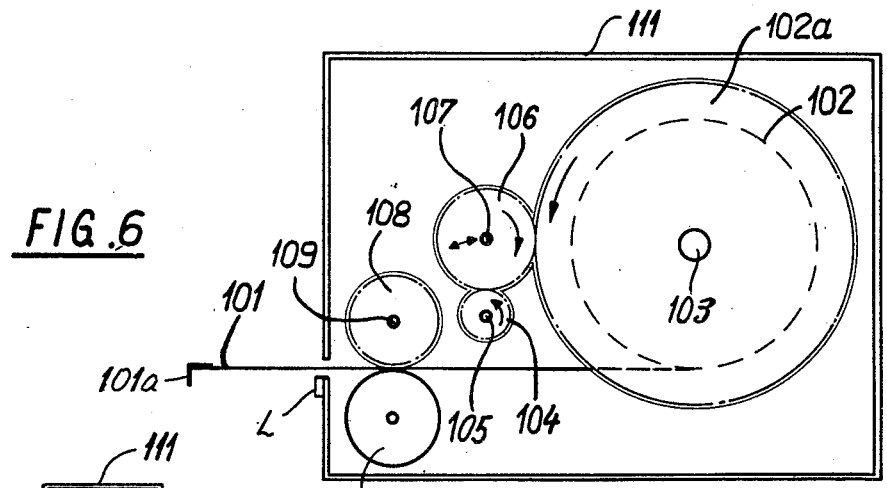
FIG. 6 is a diagrammatic side elevational view showing another modified embodiment of the instrument.

Referring now to FIGS. 6 to 10 of the drawings which show various means for electrically driving the measuring tape, and more particularly to FIG. 6, it will be seen that the measuring tape 101 is wound on a drum 102 provided with a flange 102a having peripheral teeth and revolving about a shaft 103 rotatably mounted in the case 111.

Figure 8:
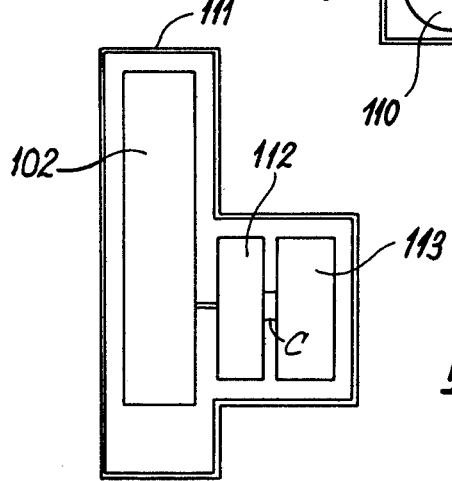
FIG. 8 illustrates in diagrammatic side elevational view the same instrument.

An electric motor 113 shown diagrammatically in FIG. 8 is adapted to drive via a reducer 112 a toothed wheel 104 mounted on a fixed shaft 105. This toothed wheel 104 is in meshing engagement with a shifting pinion 106 having its shaft 107 adapted to be shifted in the direction of the double arrow between two end positions along an arcuate path centered to the axis of the toothed wheel 104. In a first position (FIG. 6) the shifting pinion 106 is in meshing engagement with the flange 102a of winding drum 102 so as to drive the latter in the direction to wind the tape 101 in the direction shown by the arrow. By shifting the pinion 106 to its second position, this pinion 106 is caused to mesh with a driving wheel 108 mounted on a fixed shaft 109 and in direct meshing engagement with the perforations of the tape 101. In order to cause the driving wheel 108, in this position of shifting pinion 106, to pull the tape 101 in the unwinding direction, the motor 113 is associated with an inverter, or alternatively an additional pinion is interposed between the shifting pinion 106 and the driving wheel 108, or between the shifting pinion 106 and the flange 102a of the winding drum. Any known and suitable means may be provided for automatically shifting the pinion 106 from one to the other of its two positions by simply depressing the push-button controlling the winding or unwinding of the measuring tape. On the other hand, a supporting or counter wheel 110 is disposed under the tape 101, in co-planar relationship with the driving wheel 108, so that the latter can properly drive the tape 101.

The motor 113 and reducer 112 are located behind the drum 102 in an off-set projecting portion of the case 111 which may also act if desired as a handle for holding the instrument.

The arrangement described hereinabove is applicable to all types of tapes, even to textile tapes, and with it any tape return spring may be dispensed with.

Figure 7:
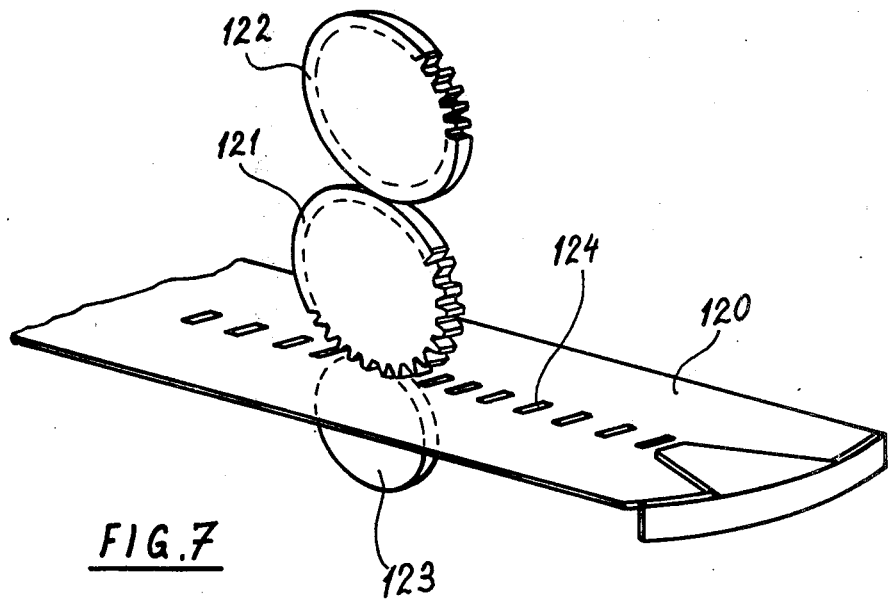
FIG. 7 is a fragmentary perspective view showing another modified embodiment of the instrument.

Reference will now be made to FIG. 7 illustrating another modified form of embodiment of the invention. In this embodiment the tape 120 is a transversely curved metal tape of a length of 10 to 20 meters, for example, and relatively wide, its maximum width being if desired of the order of 50 mm. This tape is driven by means of a driving wheel 121 meshing in turn with a toothed wheel 122 driven from the reducer coupled to the electric motor (not shown). The tape 122 is supported by a wheel 123 underlying the tape and co-planar with the driving wheel 121. As in the preceding form of embodiment, the driving wheel 121 may preferably be provided with relatively small teeth or radial pins engaging corresponding perforations 124 in the tape, or replaced by a rubber-tired wheel adapted to drive the tape simply by frictional contact.

The driving wheel 121 may be driven in either direction via a reducer for winding or unwinding the tape. In order to properly wind the tape in the case, a conventional tape return spring is mounted on the shaft.

The second form of embodiment is particularly simple since it is not required to couple the drum shaft to the motor.

According to a preferred form of embodiment of the invention, a limit switch L (FIG. 6) is provided on the case and is actuated by a hook 101a on the end of the tape for stopping the motor when the tape is wound completely in the case. It is possible to provide a clutch, notably a friction clutch or a friction coupling C (FIG.

8), between the motor and the reducer, to prevent the motor from being abruptly locked in case the tape were caught or abutted an obstacle during the winding or unwinding thereof or when the tape is wound completely in the case and its end hook strikes the case.

With the last-described form of embodiment, considering the width of the measuring tape, the latter is paid out as a rigid element from the case along a relatively great length before it yields or bends by gravity, so that measurements are greatly facilitated, the operator being able to take several measurements in a room without changing his position therein.

Figure 9:
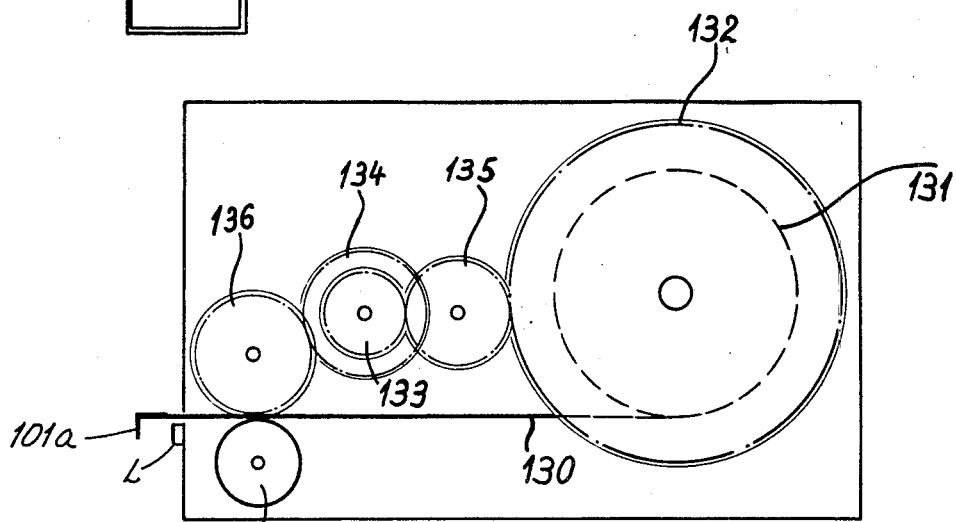
FIG. 9 is a diagrammatic side elevational view of another possible form of embodiment of the invention.

In the modified form of embodiment illustrated in FIG. 9, the tape 130 and its winding drum 131 are driven simultaneously both during the winding and during the unwinding of the tape. The electric motor (not shown) drives via a reducer a toothed pinion 133 rigid in turn with a toothed wheel 134. The toothed pinion 133 is adapted to mesh directly with an intermediate or lay pinion 135 meshing in turn with the toothed flange 132 of winding drum 131, and the toothed wheel 134 is adapted to mesh with a driving wheel 136 consisting for example of a toothed wheel, a stud wheel or a friction wheel, this driving wheel 136 engaging directly the tape 130. A support wheel 137 is also provided under the tape 130 and in co-planar relationship with the driving wheel 136.

As in the preceding forms of embodiment, a clutch, notably of the friction type, may be interposed between the motor and the reducer.

With this arrangement, it is not necessary to provide a tape return spring. In this case, the tangential velocity of the winding drum hub is constant and equal to the tangential velocity of the driving wheel 136, which will be selected to be adequate for the beginning of the winding movement; however, as the winding proceeds, this velocity will be gradually reduced, in order to wind the tape without causing the turns to adhere to each other. Nevertheless, this inconvenience is not detrimental provided that the difference in diameter between the coil formed by the turns of the fully unwound tape and the coil formed by the fully wound tape is not excessive, or in other words if the tape is not too long in relation to the drum diameter.

With the form of embodiment illustrated in FIG. 9, if we accept the fact that the turns of the coil formed by the wound tape are relatively loose with one another, any desired coupling between the motor, on the one hand, and both the winding drum and the tape-engaging wheel, on the other hand, as well as any suitable transmission means between these various component elements, may be contemplated.

Figure 10:
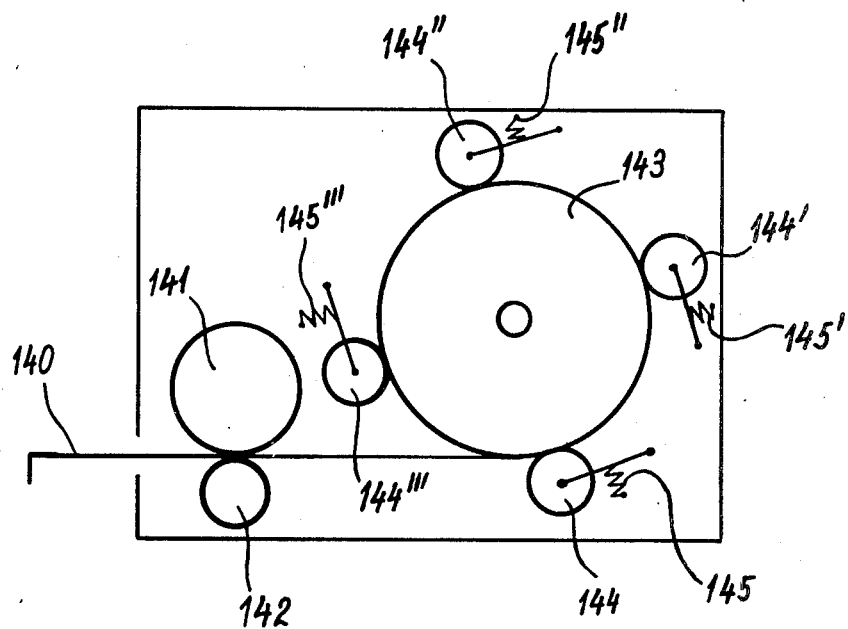
FIG. 10 is a diagrammatic side elevational view of another modified embodiment of the instrument according to the invention.

Another solution illustrated in FIG. 10 consists in driving the tape 140 by means of a driving wheel 141 driven in turn directly by the motor via a reducer, this wheel 141 bearing against a support wheel 142 registering or coplanar therewith and located under the tape 140. Also in this case, no spring means are provided for returning the tape. In order to ensure the regular and proper winding of the tape 140 on the winding drum 143, a plurality of free ball-bearing rollers, for example four in number in the example illustrated (144, 144', 144'', 144'''), are provided at spaced angular intervals about the drum 143, each roller being urged by a spring 145, 145', 145'', 145''' towards the centre of the drum. These rollers constitute a kind of cage having flexible walls, in which the tape is wound under the control of the driving wheel 141. As the tape is wound on the drum, this tape moves the rollers radially outwards. Of course, when the tape has been pulled out completely, it is necessary that at least one or two turns thereof remain in the extensible cage.

In all the forms of embodiment illustrated and described herein, the electric motor is energized by means of one or more batteries, preferably of the rechargeable type.

What is claimed as new is:

1. A tape-type linear measuring instrument comprising an instrument case, a measuring tape, a winding drum for said measuring tape, means for winding and unwinding said tape on or from said winding drum, a speed reducer having a high speed shaft and a lower speed shaft, a wheel coupled with the low speed shaft of said speed reducer and engaging said measuring tape so as to rotate in synchronishm with translational movement of said tape, an electronic pick-up comprising a movable element coupled with the high speed shaft of said speed reducer and provided with reference marks disposed at spaced intervals and a pick-up element for sensing passage of said reference marks, an electronic counter connected with and responsive to said pick-up, and means for digitally displaying the reading of said counter.

2. A tape-type linear measuring instrument as claimed in claim 1, wherein said tape has regularly spaced perforations formed therethrough in the longitudinal direction of the tape, and said tape-engaging wheel comprises teeth engageable in said perforations, the pitch of said perforations corresponding to the pitch of said teeth.

3. A tape-type linear measuring instrument as claimed in claim 1, wherein said tape-engaging wheel is a friction wheel constantly engaging the surface of said tape.

4. A tape-type linear measuring instrument as claimed in claim 1, wherein said reference marks carried by said movable element of the pick-up element are optical marks and said pick-up consists of a photoelectric cell.

5. A tape-type linear measuring instrument as claimed in claim 1, wherein said reference marks carried by the movable element of said pick-up element are magnetic marks and said pick-up is an electromagnetic pick-up.

6. A tape-type linear measuring instrument as claimed in claim 1, wherein said electronic counter comprises an up-and-down counter.

7. A tape-type linear measuring instrument as claimed in claim 6, wherein said display means comprises separate means for displaying the measurements in the tape winding direction and in the tape unwinding direction.

8. A tape-type linear measuring instrument as claimed in claim 6, wherein means are provided for adjusting the display by a preselected constant value.

9. A tape-type linear measuring instrument as claimed in claim 8, wherein said means for adjusting the display by a preselected constant value cannot be actuated unless the tape is fully wound in the said case.

10. A tape-type linear measuring instrument as claimed in claim 8, wherein said means for adjusting the display by a preselected constant value are adapted to be actuated when said tape is pulled out to any extent from the case.

11. A tape-type linear measuring instrument as claimed in claim 1, wherein said electronic counter comprises a memory-type electronic computer.

12. A tape-type linear measuring instrument as claimed in claim 1, wherein said means for winding or unwinding the tape comprise an electric motor coupled to the high-speed input shaft of the speed reducer, the wheel coupled to the low-speed shaft of the speed reduce and comprising teeth engaging the tape perforations being also adapted to drive said tape.

13. A tape-type linear measuring instrument as claimed in claim 12, wherein friction clutch means are provided between the motor output and said tape-engaging wheel.

14. A tape-type linear measuring instrument comprising an instrument case, a measuring tape, a winding drum for said measuring tape, and means for winding and unwinding said tape on and from said winding drum comprising a driving wheel directly engaging said tape, a speed reducer having a low speed shaft and a high speed shaft, an electric motor coupled with the high speed shaft of said reducer and a shifting pinion coupled with the low speed shaft of said reducer and shiftable between a first position in which it is coupled with said tape driving wheel and a second position in which it is coupled with said winding drum for winding said tape.

15. A tape-type linear measuring instrument as claimed in claim 14, wherein said tape has regularly spaced notches formed therein in the longitudinal direction of the tape, and said tape-engaging wheel comprises teeth engageable in said notches, the pitch of said notches corresponding to the pitch of said teeth.

16. A tape-type measuring instrument as claimed in claim 14, wherein a limit switch is provided for stopping the operation of said motor when the tape is wound completely in said case.

17. A tape-type measuring instrument as claimed in claim 14, wherein said tape has regularly spaced perforations formed therein and said driving wheel is a toothed wheel of which the teeth are in constant meshing engagement with said perforations formed in said tape.

18. A tape-type linear measuring instrument as claimed in claim 14, wherein said driving wheel is a friction wheel engaging directly the tape surface.

19. A tape-type linear measuring instrument as claimed in claim 14, wherein a toothed wheel is fixed on the low speed shaft of said reducer and said shifting pinion meshes with said toothed wheel and is movable along an arcuate path concentric with said toothed wheel.

20. A tape-type linear measuring instrument comprising an instrument case, a metal measuring tape, a winding drum for said measuring tape, and means for winding and unwinding said tape on and from said winding drum comprising a return spring acting on said winding drum in a direction to wind the tape on said winding drum, a speed reducer having a low speed shaft and a high speed shaft, an electric motor coupled with the high speed shaft of said speed reducer, a driving wheel coupled with the low speed shaft of said reducer and directly engaging said tape to drive said tape, and means for reversing the direction of rotation of said driving wheel for winding and unwinding said tape.

21. A tape-type linear measuring instrument as claimed in claim 20, wherein said tape is transversely curved and has a width of several centimeters.

22. A tape-type linear measuring instrument as claimed in claim 20, wherein a support wheel is disposed beneath the tape in co-planar relationship with the driving wheel.

23. A tape-type linear measuring instrument as claimed in claim 22, wherein a friction clutch is provided between the motor and the reducer.

24. A tape-type linear measuring instrument comprising an instrument case, a metal measuring tape, a winding drum for said measuring tape, means for winding and unwinding said tape on and from said winding drum comprising a speed reducer having a low speed shaft and a high speed shaft, an electric motor coupled with the high speed shaft of said speed reducer, a driving wheel coupled with the low speed shaft of said speed reducer and directly engaging said tape to drive said tape, and means for reversing the direction of rotation of said driving wheel for winding and unwinding said tape, means rotatably supporting said winding drum for free rotation, and at least one free roller and spring means for urging said roller against the periphery of tape wound on said winding drum to ensure regular and proper winding of the tape on said winding drum.

25. A tape-type linear measuring instrument as claimed in claim 24, wherein said tape is a metal tape of curved cross section and has regularly spaced perforations formed therein and said driving wheel is a toothed wheel with teeth in constant meshing engagement with said perforations in said tape.

26. A tape-type linear measuring instrument as claimed in claim 24, wherein there are four of said spring-urged free rollers disposed at spaced angular intervals around the winding drum to constitute a kind of cage having extensible walls for said tape.

27. A tape-type measuring instrument comprising an instrument case, a measuring tape, a winding drum for said measuring tape, and means for winding and unwinding said tape from said winding drum comprising a driving wheel directly engaging said tape, a speed reducer having a low speed shaft and a high speed shaft, an electric motor coupled with the high speed shaft of said reducer, means coupling the low speed shaft of said speed reducer with both said driving wheel and said drum to drive both said driving wheel and said drum simultaneously, and means for reversing the direction of rotation of said driving wheel and said drum to unwind and rewind said tape.

28. A tape-type measuring instrument as claimed in claim 27, wherein said driving wheel is a toothed wheel and said winding drum has a toothed flange thereon, and wherein said coupling means comprises gear means on the low speed shaft of said speed reducer driving said driving wheel and driving said winding drum through said toothed flange.

29. A tape-type linear measuring instrument as claimed in claim 28, wherein a limit switch is provided for stopping the operation of said motor when the tape is wound completely in the case.

* * * * *